United States Patent [19]
Brooks

[11] Patent Number: 4,541,687
[45] Date of Patent: Sep. 17, 1985

[54] SIGNAL PROCESSING SYSTEM AND METHOD

[75] Inventor: Robert E. Brooks, Manhattan Beach, Calif.

[73] Assignee: TRW Inc., Redondo Beach, Calif.

[21] Appl. No.: 529,066

[22] Filed: Sep. 2, 1983

[51] Int. Cl.[4] .............................................. G02F 2/00

[52] U.S. Cl. ............................... 350/162.12; 181/142; 343/9 PS; 350/360

[58] Field of Search .............. 181/139, 142; 343/9 PS; 350/162.11, 162.12, 358, 360

[56] References Cited

PUBLICATIONS

P. Hartemann, "Frequency-Selective Scanning of Acoustic Surface Wave," *Electronics Letters,* May 31, 1973, vol. 9, No. 11, pp. 246 and 247.

R. M. De La Rue et al, "Frequency-Controlled Beam Steering of Surface Acoustic Waves Using a Stepped Transducer Array," *Electronics Letters,* 9, 15, Jul. 26, 1973, pp. 326–327.

Chen S. Tsai et al, "Scanning of Surface Acoustic Wave Phased Array," *Proceedings of the IEEE,* Jun. 1974, pp. 863 to 864.

C. S. Tsai et al, "Surface Acoustic Wave Array Transducers and Their Applications," *Symposium on Optical and Acoustical Micro Electronics,* 1974, pp. 583 to 597.

P. Hartemann et al, "Wavefront Synthesis and Reconstruction using Acoustic Surface Waves," 1977 *Ultrasonic Symposium Proceedings,* IEEE Cat. No. 77CH1264–1SU, pp. 840–842.

P. Cauvard et al, "Ultrasound Beam Scanning Driven by Surface-Acoustic-Waves," 1978 *Ultrasonic Symposium Proceedings,* IEEE Cat. No. 78CH1344-1, SU, pp. 269–272.

*Primary Examiner*—John K. Corbin
*Assistant Examiner*—William Propp
*Attorney, Agent, or Firm*—Raymond A. Bogucki; James W. Paul

[57] ABSTRACT

A system for processing of multifrequency input signals to provide a Fourier transform output is provided which can, for example, partition a wide input frequency band into a number of narrow bands and concurrently detect the presence of one or more signals of different frequency in the input. An array of input wave energy transducers is energized with the broadband signal, and by virtue of progressive shifting of the transducers relative to the propagating medium (such as a surface acoustic wave substrate) generates one or more composite wavefronts dispersed at frequency dependent angles. An array of output transducers are disposed along a focal region, each responding to wave energy within a specific frequency range received at its location due to dispersion of the composite wavefront. Such systems preserve phase coherence while responding to multiple input frequencies, but are compact and mass producible at relatively low cost.

36 Claims, 6 Drawing Figures

SIGNAL PROCESSING SYSTEM AND METHOD

BACKGROUND OF THE INVENTION

This invention relates to systems for generating Fourier transforms of multifrequency signals, and more particularly to systems and methods using wave propagation and diffraction to partition a frequency band while retaining the full information content in the subdivided band or bands.

The mathematical generalization for the information-bearing signal of finite duration is referred to as the Fourier transform or integral. As signal processing techniques have advanced and applications have expanded there has arisen an increased need for systems and methods for effecting Fourier transformation of multifrequency input signal bands to enable meaningful information to be extracted from different frequency components within the band.

When processing broadband signals to detect the existence of one or more signal frequencies within the band or to partition the wider band into narrower subbands, it is common to employ frequency scanning techniques. Scanning techniques are sequential in nature and therefore not suitable for situations in which a number of transmitted signal frequencies must be continuously collected or monitored. Filter banks of conventional design can be complex and expensive, especially when designed to provide precise partitioning of a wide frequency band. Spectrum analyzers based upon distributed frequency-transform techniques, sometimes using surface acoustic wave devices, are used for some specific applications.

For other contexts in which small size and concurrent signal partitioning are required, there have been developed what are known as optical spectrum analyzers. These analyzers use an acousto-optic modulator through which a collimated light beam (e.g. laser beam) is transmitted. A transducer attached to one side of the modulator generates ultrasonic waves corresponding to and responsive to the signals within the frequency band under investigation. The presence of energy at given frequencies in the spectrum causes deviation of the beam through frequency dependent angles, so that one or more of an array of distributed light sensors is illuminated concurrently to identify the active frequency bands. However, such systems are relatively complex because of the presence of the laser, and also present inherent nonlinearities because of the acousto-optic interaction. Equally importantly, they can preserve the phase information of the incoming signal only through the use of complicated optical heterodyning techniques. They are also strictly unidirectional in character. Consequently, they are not of general applicability.

Workers in the art generally recognize a parallel between optical waves and acoustic waves, as illustrated by a number of articles in which various techniques for the steering or sensing of a beam are used for purposes of frequency selectivity. For example, in *Electronics Letters* for 31 May 1973, Volume 9, No. 11, at pp. 246 and 247, subject matter of this type was disclosed by P. Hartemann in an article entitled "Frequency-Selective Scanning Of Acoustic Surface Wave". The principle of using a multi-source transducer that generates a collimated beam and launches surface acoustic waves at a variable direction in a surface acoustic wave substrate toward one of a number of output transducers is described in relation to an experimental system. The concept of using a collimated beam and directing it at various angles toward receiving transducers presents significant problems. A very long path length between input and output transducers is needed to provide frequency selectivity while avoiding interference between adjacent transducers. Also, as illustrated by the frequency responses of FIG. 2*b* and the measurements represented in Table 1 of the article, the insertion losses and side lobes are high, and the number of frequencies that may be detected are consequently low for useful operative values.

An article entitled "Frequency-Controlled Beam Steering Of Surface Acoustic Waves Using A Stepped Transducer Array", by R. M. De La Rue et al, published in the *Electronics Letters,* 9, 15, pp. 326–327, July 26, 1973, describes the construction and operation of a multi-element transducer array in which the elements are arranged linearly along an anisotropic substrate. This construction demonstrates that a surface acoustic wave beam may be steered in one direction or another in correspondence with frequency deviations from the center frequency. It is proposed that this may be used to switch between two or more separate receiver transducers or to provide frequency-band separation.

A related system is described in an article entitled "Scanning Of Surface Acoustic Wave Phased Array" by Tsai et al in *Proceedings of the IEEE*, June 1974, pp. 863 to 864. The article also proposes the use of interdigital transducers placed side-by-side perpendicular to the nominal acoustic propagation path and discloses changing the direction of scan by varying the phase of the drive to each transducer, although frequency scanning is also mentioned. The article also proposes the use of such a transducer array in a different fashion, in which signals received by the antenna elements of a phased-array antenna would be applied on a 1:1 basis to the transducers, so as to be capable of detecting applied signals simultaneously. A related technique is described by the same authors in an article entitled "Surface Acoustic Wave Array Transducers And Their Applications" in the *Symposium On Optical And Acoustical Micro Electronics*, pp. 583 to 597 (1974). In this article the plane array is supplemented by a stepped array of elements and the frequency scanning approach is discussed in greater detail. It is proposed, very generally at page 595, to provide the function of an acousto-optic spectrum analyzer, by arranging a number of output transducers along a circumference at a far-field location of the acoustic beam. However, a practical system for this purpose is not discussed, and a long path length would again be needed to achieve clear separation of the collimated waves, unless employing an acoustic lens as briefly mentioned. Further consideration shows that the proposed approach encounters severe problems if it is desired to have a high level of frequency discrimination, high signal-to-noise ratio and realistically low side lobes. Furthermore, it is now understood that consideration must be given to more subtle coactions between the input array and the output array as well as the anisotropy of the propagating medium.

Subsequent work by P. Hartemann and P. Cauvard is presented in an article entitled "Wavefront Synthesis And Reconstruction Using Acoustic Surface Waves", published in the 1977 *Ultrasonic Symposium Proceedings*, IEEE Cat. No. 77CH1265-1 SU. This system is based upon the use of a circular array of surface acoustic wave point sources, disposed on an isotropic medium, and fed through a tapped surface acoustic wave delay line for frequency steering. This substrate limits the frequencies that may be used to approximately 50 MHz, and the arrangement is inefficient because the large angle of divergence from each transducer wastes energy among many diffracted orders. Essentially the same system was again later described with further detail by the same authors, with others, in an article entitled "Ultrasound Beam Scanning Driven By Surface-Acoustic-Waves" published in the 1978 *Ultrasonic Symposium Proceedings*, IEEE Cat. No. 78CH1344-1 SU, pp. 269–272.

Such prior art systems essentially demonstrate the feasibility of operation of different parts of a wide band signal partitioning system, but they do not directly confront many, often conflicting, requirements imposed by advanced systems applications. In order to use higher center frequencies, and to cover wider bandwidths, problems unrecognized and unaddressed by the prior art must be overcome. As frequency increases, the propagation losses in a piezoelectric substrate increase, and it becomes more difficult to obtain a large fractional bandwidth and a low insertion loss. In addition, one must consider the practical limitations of lithography and other reproduction processes that can be used in making economically acceptable devices and systems. In this regime of high frequency, wide bandwidth applications, frequency selectivity and system sensitivity become of significance, particularly where it is desired to identify relatively brief and low signal amplitude components of unknown frequency within a wide bandwidth.

The band partitioning functions which have been discussed exemplify some of the problems involved in Fourier transform processors for multifrequency signals. In addition, the particular mode of the transformation should not limit system capability by destroying phase information or requiring complex processing for information retrieval. From the practical standpoint the system must be physically realizable using reliable manufacturing techniques and must operate substantially uniformly throughout a wide bandwith.

SUMMARY OF THE INVENTION

Fourier transforms of multifrequency signals are established in accordance with the invention by multiple transmitters activated by a common input signal but arranged to provide frequency or wavelength dispersion and focusing of a composite wavefront. Input and output transducer arrays coacting with a propagating medium enable retention of phase coherence and bidirectional operation so that a wide range of processing functions can be utilized.

Systems and methods in accordance with the invention partition a given frequency band into a number of narrower subbands by introducing like input signals from a number of transmitting elements into a propagating medium with frequency dependent dispersion established in the medium such that a composite wave is focused at a finite distance from the transmitters and at a variable angle for the signal frequencies that are present. More specifically the individual sources contributing to the composite wave are displaced relative to the medium such that the focal position of the composite wave changes with frequency, and a number of signal receiving elements are disposed in the path of the focused wave to generate separate phase coherent output signal frequencies. Where a number of frequency components are present in the input frequency band, these are simultaneously and individually reconstructed in phase coherent fashion at the receiving elements.

In accordance with the invention, the transmitting and receiving elements are advantageously configured as acoustic wave transducers disposed on a substrate capable of propagating surface acoustic waves. Isotropic materials or selectively oriented anisotropic crystals may be used. It is show that high propagating efficiencies may be achieved by using an anisotropic surface acoustic wave substrate and disposing the transmitting elements along group velocity curves, while tuning the individual receiving elements to the frequencies to which they are differently responsive. Such constructions may be extremely compact in size but manufactured by known thin film techniques with the needed precision and low cost.

In a more specific example of a system for detecting the occurrence of one or more frequencies within a relatively wide frequency band, a plurality of interdigitated transducers are disposed on a surface acoustic wave substrate, and fed in parallel from an input signal source. Each transmitting transducer is oriented with respect to a predetermined focal region, but placed along a curved axis such that differentially varying phase delays are introduced in the waves propagated by successive transducers. Using an anisotropic lithium niobate substrate, as one example, the interdigitated transducers focus wave energy on one or more interdigitated receiving elements disposed in an arc at the focal plane of the system, to provide partitioning of frequencies.

In accordance with other features of the invention, signal response is substantially enhanced by spatially distributing or configuring the pattern of thin film elements in an input transducer array such that peak energy is transmitted from the center of the array, with the energy transmission decreasing monotonically to the edges of the array. The elements of an output transducer array are configured such that each element is oriented relative to the best beam steering angle, and configured for interaction with the impinging acoustic wave field. Consequently, system performance is substantially increased in terms of frequency selectivity.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
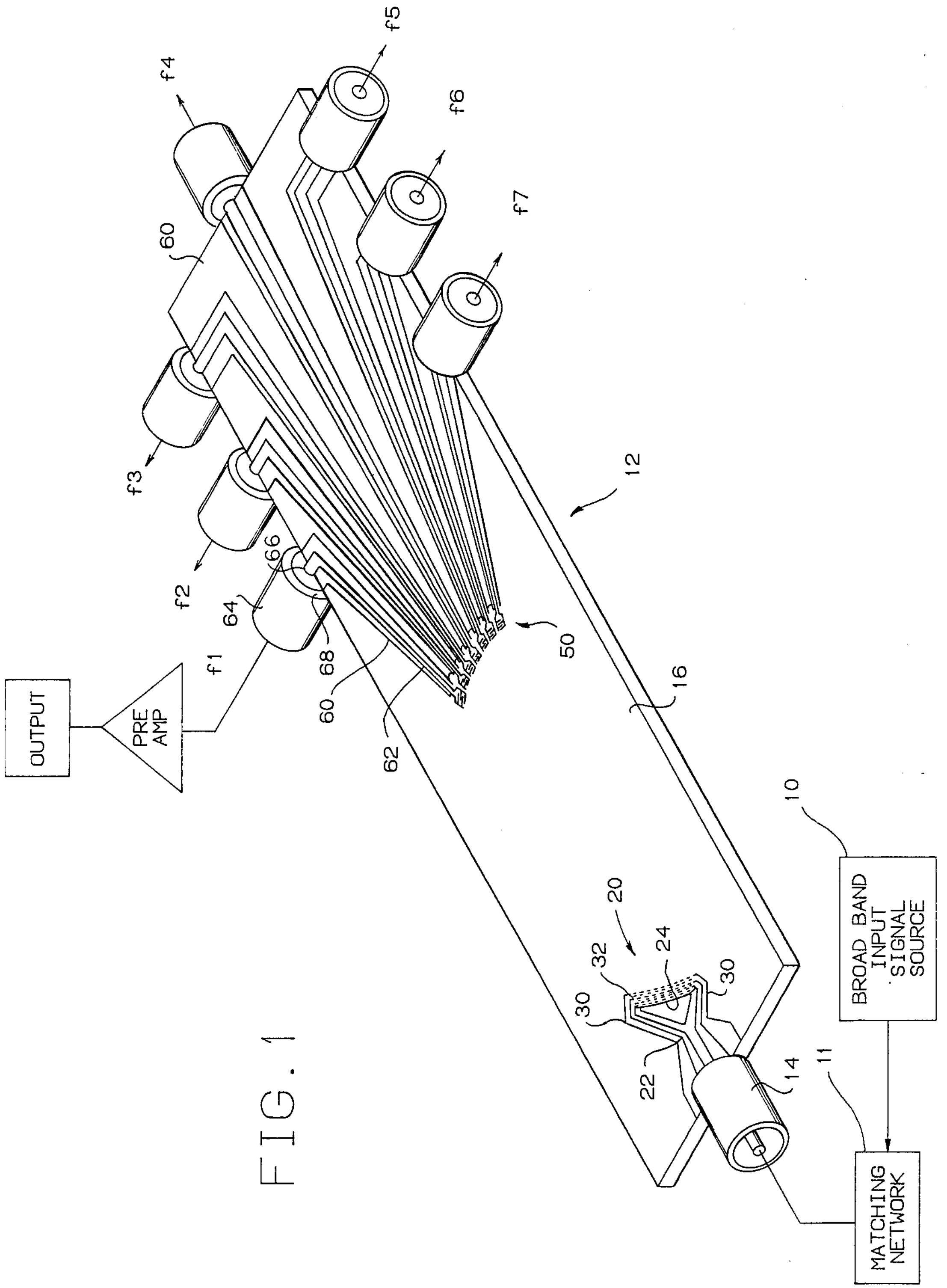
FIG. 1 is a perspective view, somewhat simplified, showing the principal elements of a system in accordance with the invention for partitioning an input signal band into a number of lesser frequency bands.
Figure 2:
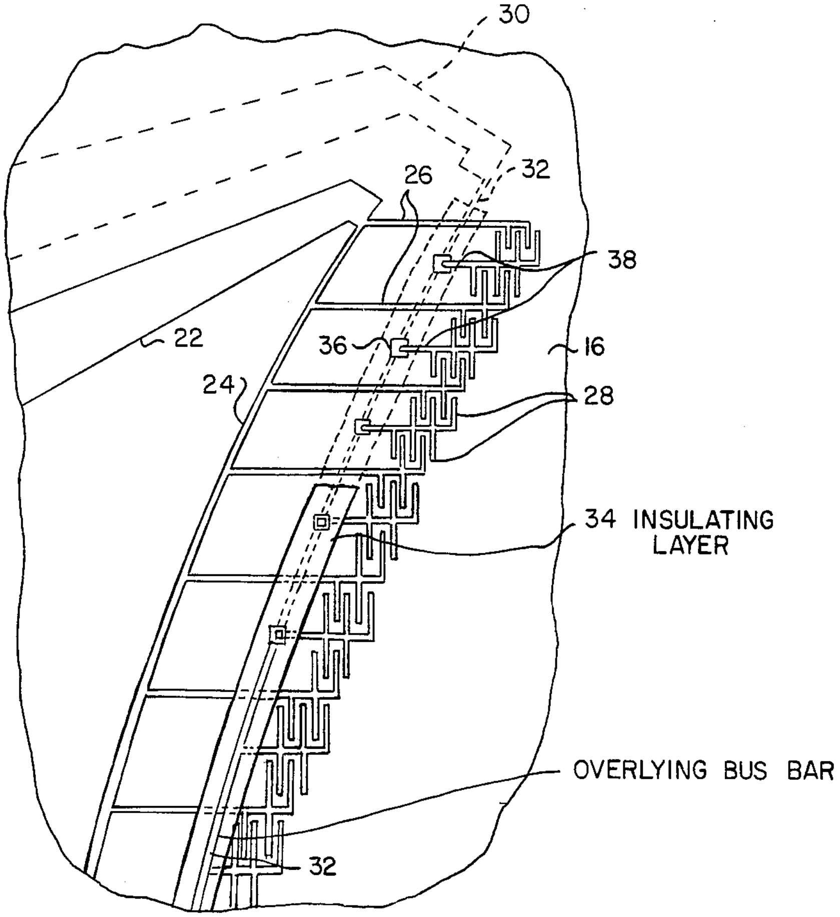
FIG. 2 is an enlarged fragmentary view of a number of transmitting transducers that may be utilized in the arrangement of FIG. 1.
Figure 3:
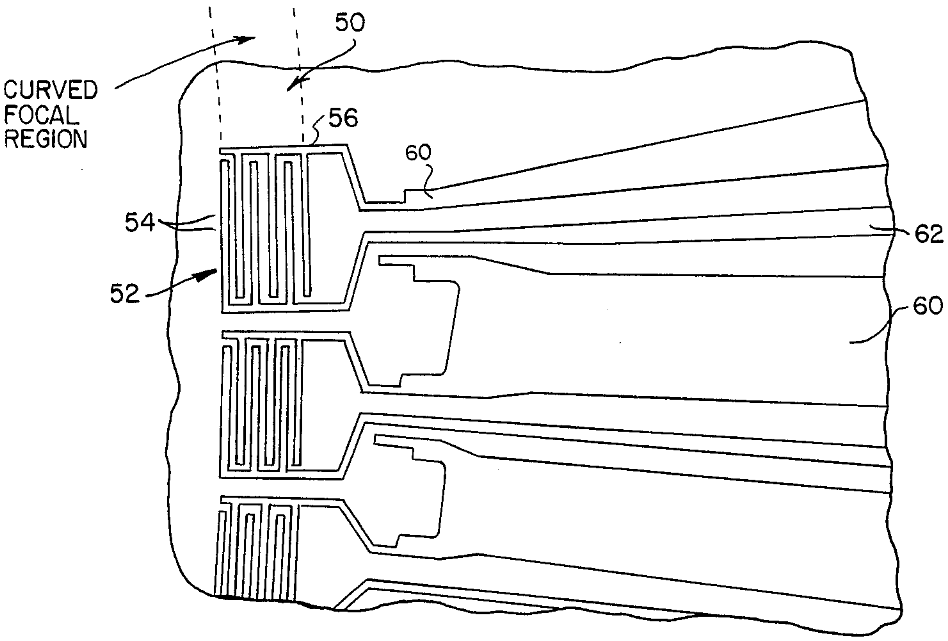
FIG. 3 is an enlarged fragmentary view of a number of receiving transducers that may be utilized in the arrangement of FIG. 1.

Although spatial Fourier transform systems for subdividing frequency bands in accordance with the invention may be utilized in a substantial number of different contexts, as described in greater detail hereafter, the example of FIGS. 1-3 is illustrative of a signal partitioning structure operating over a 40 MHz bandwidth. This structure may be employed with a number of similar units having different dimensions. In this multiple array, each unit is assigned a different contiguous bandwidth, for detection of one or more frequencies within a wide (e.g. 500 MHz) frequency band. The integrated system responds to the presence of a pulse or continuous signal, whether of analog or digital data modulating a carrier, so that all meaningful signals in different portions of the input frequency band are identified. This is one example of a system in accordance with the invention for providing a spatial Fourier transform of a multifrequency input signal. The system may also be regarded as a form of spectrum analyzer, enabling the concurrent detection and analysis of individual frequency components within a given bandwidth.

A limited number of input transducers and output transducers are depicted in the device of FIG. 1, in order to provide a predetermined degree of division of the input bandwidth. It will be recognized by those skilled in the art, however, that substantially more input and output transducers may be utilized, and further that a number of such devices may be employed, each assigned to a given portion of a wide frequency band. An input wideband signal may be subdivided by filtering techniques into moderately wide bands which can then be heterodyned down to a suitable frequency range, such as 750 MHz to 1250 MHz. Each different subband within this range may then be applied to a different partitioning structure as shown in FIG. 1.

In the example of FIG. 1 an input signal source 10 providing signals in an 80–120 MHz band with a center frequency $f_o$ of 100 MHz serves as the RF source. The 40% fractional bandwidth provided by the source 10 may be increased up to approximately 66% without overlap between different orders of diffracted beams. However, in most configurations the fractional bandwidth is limited to 50% for practical considerations. The signal source 10 is coupled through an electrical matching network 11 to one end of the processor device 12 by a conventional coaxial conductor 14. The input circuits, which may comprise a thin film amplifier as well as the matching network 11, have not been shown in detail inasmuch as they may be conventional.

Physically and electrically, the processor device 12 is based upon a piezoelectric substrate 16, here a lithium niobate ($LiNbO_3$) crystalline structure, which material is X-axis propagating and has a 128° rotated-Y cut. It is preferred to employ, with presently available materials, a substrate having a Y-rotation angle between 110° and 135°, such materials typically having small anisotropy. However, isotropic as well as both positive and negative anisotropic materials may be employed observing considerations set out hereafter. The substrate 16 has linear and elastic characteristics and propagates surface acoustic wave (SAW) energy with low attenuation. In the present example, the structure is less than 6 cm long overall and 1 cm wide with an internal focal length of 26.5 mm between transmitting and receiving arrays. Consequently, attenuation is extremely low, although with higher acoustic frequency attenuation increases approximately as the square of the frequency, so that attenuation can be an important design factor at frequencies above 1 GHz. The $LiNbO_3$ material has a constant anistropy of about −0.25, a constant anisotropy being assumed as a valid approximation for the relatively small angles of deviation involved in this example. The piezoelectric substrate 16 further facilitates the mass reproduction of precision input and output transducer arrays for surface acoustic wave interactions. However, the medium need not be piezoelectric as long as wave transduction can be effected, as by the use of a piezoelectric material only in the region of the transducers. It will be appreciated by those skilled in the art that the concepts of the invention may also be practiced with surface skimming bulk waves (SSBW), and bulk acoustic waves, and indeed with other forms of wave propagation.

However, there are a number of advantages derived from the use of this structure with surface acoustic waves, and the use of this type of substrate is thus preferred. In common with a limited number of other types of wave energy processing systems, propagation and transduction functions can be reversed without the introduction of other effects or the use of additional elements, so that the system is capable of operating in bidirectional modes. The propagation velocity of acoustic waves in this medium is also approximately 4 km per second (as opposed to approximately 0.3 km/s in free space) and there is limited temperature sensitivity.

The individual input transducers of a plurality of input transducers disposed in a SAW input transducer array 20 are energized in parallel from the signals on the coaxial connector 14. Details of this structure are shown with greater clarity in the enlarged view of FIG. 2, to which reference is also now made. The center conductor of the coaxial connector 14 is electrically coupled to a central thin film bus of conductor 22, which has a somewhat asymmetrical Y-shape including two extending arms. The ends of the two arms lie along a line which is at an angle relative to the central longitudinal axis of the substrate 16. A surface line or signal bus 24 between the ends of the arms thus provides a common RF source for a number of branch conductors 26 which extend in a direction approximately parallel to the central axis. The branch conductors 26 in turn serve as drive lines for a number of individual interdigitated transductors (IDTs) 28 which are disposed at progressively advanced positions along the central axis. Each input IDT 28, in a uniform progression from one end (the bottom in FIG. 2), is advanced by one acoustic wavelength, taken at the wavelength $\lambda_o$ at the center frequency $f_o$. Other integral numbers of wavelengths may also be used for this progressive spacing. There are 31 input IDTs in this example, each also being coupled in parallel to the outer or common envelope of the coaxial connector 14 via a pair of side conductors 30 which are spaced apart from the outer periphery of the Y-shaped conductor 22, and which are interconnected at their interior ends by a bus bar 32 lying substantially parallel to the signal bus 24. For ease of fabrication, the bus bar 32 is disposed on the upper surface of an insulating layer 34 (seen in FIG. 2 only) and is coupled directly or capacitively through the insulating layer 34 to a number of contact pads 36 lying on the substrate 16. Drive lines 38 from the individual contact pads 36 couple to the opposite side of each transducer 28 to complete the circuit for impressing an electrical potential across the transducer. This geometry enables the transducers to be weighted or varied in an interrelated fashion so as to modify the radiation patterns or power output. Here the thin drive lines 26 are varied in resistive value by using different widths (not shown to scale in the Figures). Resistive elements may be placed in circuit with the individual IDTs, or the geometries of the IDTs may be varied in a selective pattern for the same purpose. As another alternative, the number of fingers or the degree of finger overlap, or both, may be varied relatively so as to achieve the weighting effect. In accordance with known weightings (e.g. the Hamming function), the field across the input array 20 is varied smoothly and monotonically from minimums at the edges to a maximum in the center.

Figure 4:
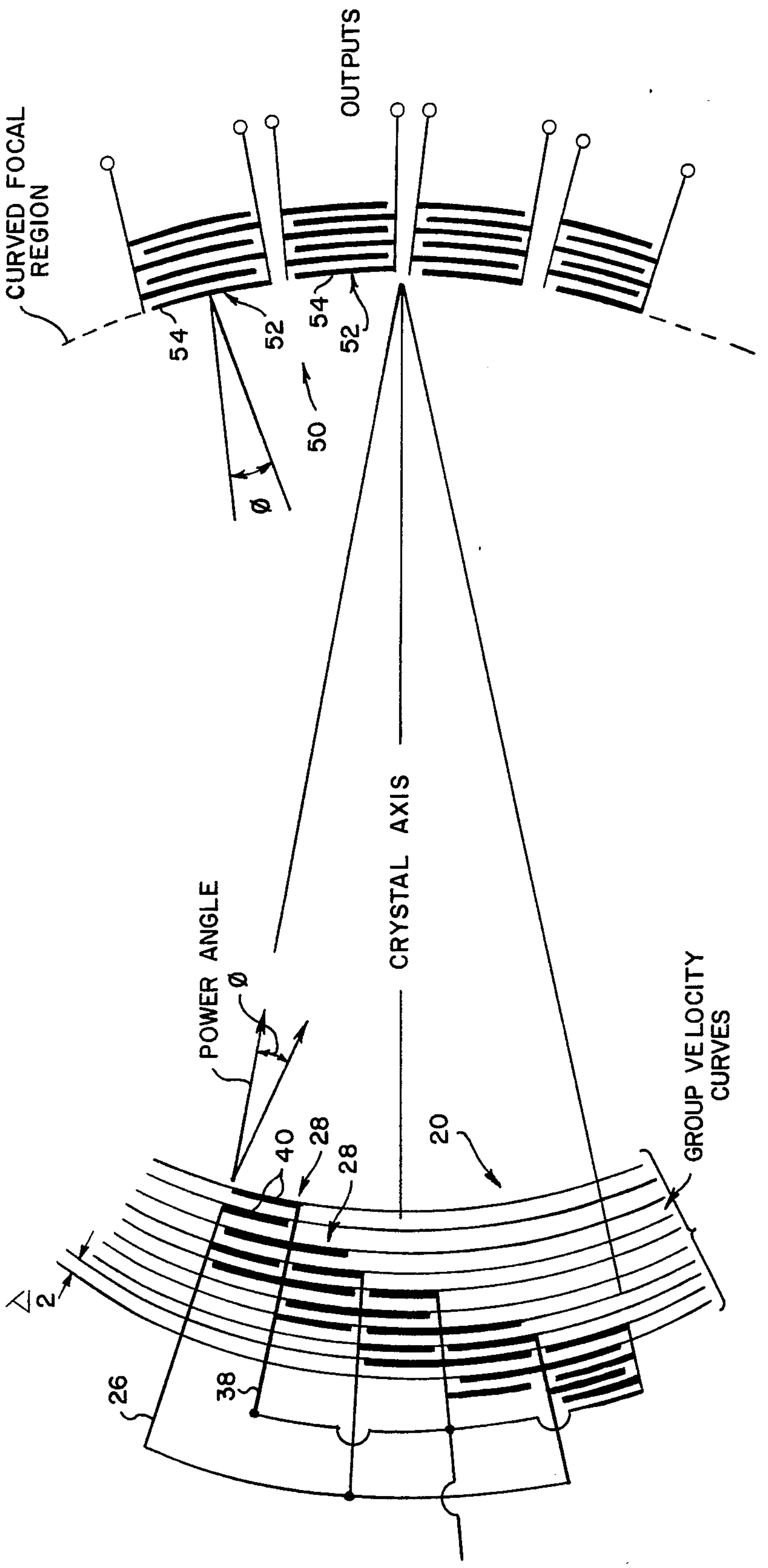
FIG. 4 is a diagrammatic view of the placement of interdigitated elements on transmitting transducers along group velocity curves in systems in accordance with the invention.

As seen in the enlarged view of FIG. 4, each SAW input IDT 28 is specifically configured with respect to a geometrical reference defined by a plurality of group velocity curves calculated to match the anisotropic characteristics of the substrate 16. In accordance with the invention, the plurality of IDTs 28 in the input array 20 are both focusing and dispersive and to this end each is configured with both a particular shape and placement relative to the substrate 16. Each transducer 28 comprises five fingers 40 directed inwardly from the spaced apart drive lines 26, 38 in alternating and therefore interdigitated fashion. These fingers 40 are deposited by the same photolithographic process as are the associated conductors, and are therefore of thin film aluminum and extremely small, being 0.25 in line width and each approximately $1.3\lambda_o$ in lateral overlapping extent across the transducer. The electrical potential variations between adjacent transducer fingers 40 result in excitation of an acoustic wave in the substrate 16 in directions somewhat parallel to the central axis but precisely defined. Each transducer 28 is sized and positioned so that the array 20 concentrates energy in the first order diffraction beam and suppresses other beam orders substantially. Stepping with the inclination shown to the longitudinal central axis and with steps of $\lambda_o$ gives what may be referred to as the $+1$ diffracted order, whereas the $-1$ order would be propagated for the opposite inclination but the same step spacing.

The wavefronts propagated in the substrate 16 by the different transducers 28 advance toward a common region dependent on frequency by virtue of a slight rotation of each transducer relative to the next that considers the effects of substrate anisotropy. For each transducer 28 of the central crystal axis the angle of power propagation is slightly outward from the crystal axis, as shown in FIG. 4. Thus the apparent direction of each transducer is different from the actual beam propagation direction, and it is this "beam steering" angle which is adjusted to insure that the propagated energy is all directed toward the same nominal focal region. In addition, the fingers lie along the group velocity curves, which are generally parabolic arcs spaced by a distance $\lambda_o/2$ along the central axis. However, in the present example there is only a small deviation from the circular, and so an approximation of a circular arc is acceptable. However, those skilled in the art will recognize that placement of the fingers 40 relative to the group velocity curves, and to each other, can be of significant importance in achieving focusing with the array 20 that approaches or attains the diffraction limited condition.

Each finger 40 (if straight) lies along a tangent to a group velocity curve, or may be slightly curved as shown in FIG. 4 to correspond to the group velocity curve. Alternatively each finger 40 may be slightly convex for more uniform response across the input signal band. Each finger of an array is spaced apart from the next by the difference between adjacent group velocity curves, or $\lambda_o/2$. In addition, as previously noted, each IDT 28 is progressively advanced toward the focal point (taking the direction of decreasing phase delay) by one acoustic wavelength. When this phased array of SAW transducers 28 is then driven in parallel by the input RF signal, as is described in greater detail below, composite wavefronts are formed which define a beam that focuses at a focal arc and varies in direction in accordance with the input frequency. It is feasible to use other composite beams than the first order beam by changing the phase advance relationship between IDTs to a different integral number of wavelengths. In the specific example of FIG. 2, $\lambda_o/2$ is approximately 20 microns, and the inter-transducer spacing is approximately 40 microns. The usage of the propagation delay in the substrate to achieve precise phase relationships between the different input transducers substantially simplifies fabrication and operation of the system.

The input transducer array 20 is geometrically opposed to and spaced apart from a dissimilar output transducer array 50, here comprising a number (7 in total) of individual interdigitated transducers 52 disposed along a curved focal region. The output transducers 52 can, however, be forward or behind the focal arc so long as the finger shape matches the wavefront. Furthermore there is both a depth of focus and a transducer 52 depth along the propagation direction which can be used in modifying response characteristics. Although all of similar shape, the output IDTs 52 (seen also in FIG. 3) have different widths and finger 54 placements so that each is selectively responsive to the particular narrow frequency band that is propagated to its spatial location. Again, the entire output transducer array 50 may be deposited by photolithographic techniques as thin film aluminum or other conductor, including gold or copper. At each transducer 52, conductors 56, 57 from the opposite sides of the fingers 54 are individually coupled to a ground plane conductor 60 and a center conductor 62 in a fan-out arrangement of increasing width. As seen in FIG. 1, the center conductors 62 each couple to the center conductor 66 of a different coaxial connector 64, with the ground conductors 60 being coupled to the outer sheath 68 of the coaxial connector 64. The shapes of the fingers 54 of the transducers 52 generally match the curvature of the acoustic phase front of the wavefronts propagated in the piezoelectric substrate 16, as seen in FIG. 4. In accordance with the frequency of applied wave energy, the widths, lengths and spacings of the thin film patterns defining the transducer conductors vary in successive fashion, from the largest transducer at the lowest frequency to the smallest transducer at the highest frequency. FIG. 4 additionally shows how the angle of each transducer 52 relative to the central crystal axis is varied to account for the beam steering effect. A line perpendicular to the fingers 54 deviates by an angle $\phi$ from the power reception angle at which piezoelectric energy is transduced back to a voltage difference between the terminals of the transducer 52.

The acoustic field distribution has a finite width and the main propagated lobe is accompanied by diffraction sidelobes. The acoustic field distribution at the output assumes the $(\sin X/X)^2$ function if each input transducer contributes the same amount of power to the output transducers. In consequence the sidelobes would be only −13 dB below the peak and would fall on adjacent transducers so as to introduce spurious (out-of-band) signals. The output transducers receive not only main lobe power and incident sidelobes, but also receive spurious acoustic energy resulting from random scattering, which can further tend to reduce the signal-to-noise ratio and the desired dynamic range. To partition signal frequencies in the input spectrum with high efficiency it is desirable to have a wide dynamic range.

In accordance with the invention, the contributions of individual input transducers in the input array, and the response characteristics of the individual output transducers in the receiving array are varied in interrelated fashion. The power distribution across the input array is weighted monotonically from a center peak to minimum values at each outer end. That is, the power contributed by each transducer is varied in accordance with a window function, such as the Hamming and minimum 3-sample Blackman-Harris functions described in the literature. The Hamming function is used in this particular example and employs an acoustic power distribution that varies no more than 12:1 between maximum and minimum. In consequence, the resultant Fourier transform and output energy distribution define a narrow central lobe and maximum sidelobe levels of −43 db at the output. The sidelobes may therefore be regarded as substantially suppressed during the diffraction of the acoustic waves and the generation of the spatial Fourier transform. At the output transducers the spatially dispersed main lobes and sidelobes impinge on the closely separated output transducers, aligned along the focal region. By mode matching of the finger shapes to the acoustic phase front, by using output transducers tuned to frequency in accordance with beam position, and by angling the output transducers to compensate for beam steering effects, the output response is maximized.

The transformation action defined by this system is planar in character, and is therefore sensitive to beam direction along only one axis. Because beam direction is responsive to the Fourier transform of the input signal, a time-Fourier transform may be said to be provided in a single dimension.

In the operation of the system of FIGS. 1–4, the input transducer array 20 appears, in one sense, as a focusing transducer responsive to the input signal source 10. However, by virtue of division into an array of individual transducers 28, incorporating phase delayed steps by differential propagation lengths within the piezoelectric substrate 16, the input array 20 is also made dispersive. The waves propagated from each individual transducer 28 toward the focal arc combine into a composite curved wavefront that focuses on one or more elements in the output array. The wave energy at each spatial position moreover is at a frequency unique to that position.

Figure 5:
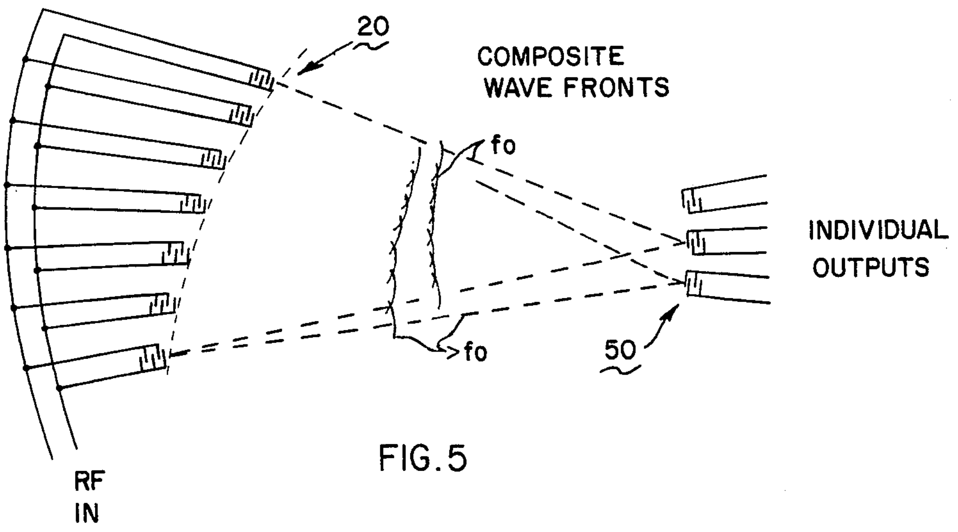
FIG. 5 is a simplified diagram of a transmitting array showing in idealized form how composite waves are formed.

The wideband input signal from the source 10 is applied in parallel to the transducers 28 in the input transducer array 20. The voltage differences between the fingers 44 at each instant of time excite the underlying piezoelectric substrate 16, initiating like waves to be propagated in the substrate. As best seen in the fragmentary and simplified view of FIG. 5, the individual wavefronts are propagated individually along separate beam paths directed toward the common focal region. As seen in FIG. 5, at the center frequency $f_o$ the diffracted acoustic waves define a curved composite wavefront directed to and focusing on the selected central region of the focal arc along which the output array 50 is disposed. If energy is present at other frequencies, different focused composite wavefronts are concurrently formed. At shorter wavelengths, for frequencies greater than $f_o$, the contributions add in phase along an arc that tilts downwardly, as seen in the Figure, and so the radiated beam travels downwardly to focus at a different region on the focal arc. Conversely, at longer wavelengths the composite wavefront travels in the opposite direction (upwardly). Thus by phase additions dependent on wavelength, the focused acoustic waves are dispersed along the focal arc to positions at which they excite different ones of the transducers 52 in the output transducer array 50. This may be regarded in a sense as a spatially distributed frequency scanning arrangement, although the system functions concurrently on the time base. However, if the input signal varies sequentially in frequency, it can be seen that beam scanning results.

As previously noted, this configuration employs the first diffracted order (here +1 in the depicted form) and substantially suppresses beams of other orders. The composite beams fall on one or more of the output transducers 52 that span the focal arc and respond to the individual composite beams. Thus the input signal is effectively partitioned in accordance with frequency. The frequency selective shape of each different output transducer 52 enhances the frequency selectivity, and hence the dynamic range of the system, which is in excess of 50 dB. Contributing factors to this large dynamic range are derived from the linear electro-acoustic interaction at the transducers, and the high input signal levels which can be utilized. It should be noted that the signal energy remains coherent during transduction and propagation, so that phase information is available at the system output and may be used in other ways, such as determining signal direction or extracting other types of information from the signal. It should also be noted that the system has bidirectional capability inasmuch as the transducers and the propagating medium are reciprocal in character.

Figure 6:
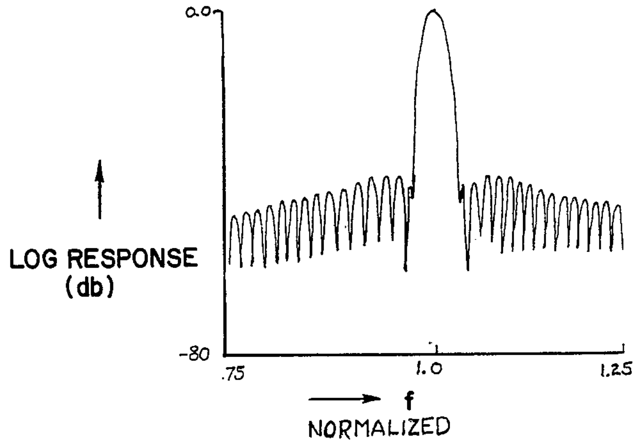
FIG. 6 is a graphical representation of the relative amplitudes of the principal lobe and side lobes of composite beams formed in systems in accordance with the invention.

Although the entire processor device 12 is extremely small, it is conveniently fabricated using conventional photolithographic processes, observing close but not restrictive fabrication tolerances. Using weighting of the input transducers in accordance with the Hamming function spurious side lobes and scattered energy by using output transducers whose widths are equal to two side lobes, the main diffracted beam gives a significantly higher signal relative to associated side lobes, as depicted by the solid line curve in FIG. 6. The focusing and dispersion technique, using transducers configured as previously described, enables substantially diffraction limited beams to be focused at the output transducer array 50, and high coupling efficiencies at the transducers further enable efficient utilization of the wave energy.

It will be appreciated by those skilled in the art that the input transducer array can take the form of a multiplicity of radiating pairs of elements, as shown by P. Hartemann in the article entitled "Frequency-Selective Scanning Of Acoustic Surface Wave" published in *Electronics Letters*, 31 May 1973, Vol. 9, No. 11, pp. 246–247. Even though the pairs of fingers are serially disposed in a regular sequence it can be seen that a number of transmitting elements are defined.

For broadbanding of the input transducers the fingers may be geometrically varied so as to couple energy to the substrate with more equal efficiency throughout the band. Apart from geometry or circuit variations that may be used to correspond to a weighting function, however, the input transducers are essentially similar.

This basic configuration is extremely useful in Fourier transform systems for other reasons as well. A high power density can be established in the substrate material, without introducing significant nonlinearities. The device is also substantially insensitive to temperature changes, although extremes of temperature variation affect propagation velocities and acoustic wavelengths and accordingly shift frequencies somewhat.

Although various forms and exemplifications of the invention have been described above, it will be appreciated that the invention is not limited thereto but encompasses all modifications and expedients within the scope of the appended claims.

What is claimed is:

1. A system for processing of multifrequency input signals to provide a Fourier transform output comprising:

means defining a wave propagating medium;

an input array including a number of input transducers coupled to the propagating medium;

each of said input transducers being responsive to the input signals;

said input transducers generating coherent waves launched toward a spaced apart focal region;

said input transducers being spaced along the medium to form composite wavefronts;

said composite wavefronts focused at frequency dependent locations in the focal region; and a number of output transducers disposed along the focal region;

said output transducers responsive to the composite wavefronts propagated toward them, such that excitation of an output transducer represents one range of frequency components of the input signals.

2. The invention as set forth in claim 1 above, wherein the focal region is an arc and the output transducers are disposed along the arc.

3. The invention as set forth in claim 2 above, wherein the excitation of an output transducer includes coherent and phase preserved information.

4. A system as set forth in claim 1 above, wherein the input and output transducers comprise interdigitated surface acoustic wave transducers and the means defining a wave propagating medium includes means for propagating surface acoustic waves.

5. A system as set forth in claim 4 above, wherein the input and output transducers are angled relative to beam propagation paths to provide optimum transduction efficiency with the wave propagating medium.

6. A system as set forth in claim 5 above, wherein the digital elements of the input transducers are positioned on group velocity curves and the input transducers are spaced apart along the wave launching direction by an integral number of wavelengths for a predetermined frequency.

7. A system as set forth in claim 1 above, wherein the input transducers include means for varying the wave energy therefrom in interrelated fashion such that side lobe propagation is suppressed.

8. A system for receiving signals over a wide frequency band and responding concurrently to the existence of one or more frequency components within the band, comprising:

a substrate having a plurality of propagation axes;

a plurality of acoustic wave input transducers;

said input transducers being energized in parallel by an input signal;

said input transducers being located on said substrate so as to launch waves toward a focal region;

said focal region located apart from said input transducers; and output transducers arranged in said focal region;

said output transducers being energized by said waves arriving in said focal region;

said output transducers' energization being proportional to the frequency components of said input signal.

9. The invention as set forth in claim 8 above, wherein the focal region is an arc and the output transducers are disposed along the arc.

10. The invention as set forth in claim 9 above, wherein the excitation of an output transducer includes coherent and phase preserved information.

11. A system as set forth in claim 8 above, wherein the input and output transducers comprise interdigitated surface acoustic wave transducers and the means defining a wave propagating medium includes means for propagating surface acoustic waves.

12. A system as set forth in claim 11 above, wherein the input and output transducers are angled relative to beam propagation paths to provide optimum transduction efficiency with the wave propagating medium.

13. A system as set forth in claim 12 above, wherein the digital elements of the input transducers are positioned on group velocity curves and the input transducers are spaced apart along the wave launching direction by an integral number of wavelengths for a predetermined frequency.

14. A system as set forth in claim 8 above, wherein the input transducers include means for varying the wave energy therefrom in interrelated fashion such that side lobe propagation is suppressed.

15. A system for responding to one or more signal frequencies within a given input frequency band, comprising:

an acoustic wave propagating medium;

a plurality of transmitting elements;

said transmitting elements disposed along an array path;

said array path at least partially transverse to a nominal beam launching axis in the medium;

said transmitting elements displaced in progressive advanced positions along the beam launching axis;

said transmitting elements being excited by the input frequency band;

each of said transmitting elements angled toward a predetermined region along the beam launching axis;

said disposition of said transmitting elements producing different focused composite beams in the medium at angles relative to the nominal axis;

said angles being dependent upon each signal frequency present in the input band; and means disposed within a focal region and spanning the nominal axis for responding to the existence of composite beams at the focal region.

16. The invention as set forth in claim 15 above, wherein the medium is an anisotropic medium and each transmitting element is at an angle to the pure mode axis such that the power flow angle deviations are different than the propagation angle deviations.

17. The invention as set forth in claim 15 above, wherein the transmitting elements comprise acoustic wave transducers, and the system further comprises means for exciting the transducers in parallel.

18. The invention as set forth in claim 17 above, wherein the medium is a surface acoustic wa substrate and the acoustic wave transducers each include a plurality of interdigitated elements configured variably such as to excite surface waves across an approximately 50% fractional bandwidth.

19. The invention as set forth in claim 17 above, wherein the acoustic wave transducers include means for varying contributions to the output such as to reduce side lobes.

20. The invention as set forth in claim 19 above, wherein the acoustic wave transducers include means for providing highest contribution from the center transducers in the plurality, with contributions varying monotonically to those transducers at the ends of the plurality.

21. The invention as set forth in claim 17 above, wherein the means for responding to the composite beams comprises a plurality of receiving transducers spaced apart along the focal region and each including a plurality of interdigitated fingers, each transducer being configured to be responsive to the frequency range of the composite focused beam directed thereat.

22. The invention as set forth in claim 15 above, wherein the crystal is lithium niobate, $LiNbO_3$.

23. The invention as set forth in claim 22 above, wherein the acoustic wave propagating medium is a surface acoustic wave propagating crystal having a rotated Y, X propagating cut, with the Y rotation angle being between 110° and 135°.

24. A system for receiving signals over a wide frequency band and responding concurrently to the existence of one or more frequency components within the band, comprising:

a planar substrate having a plurality of propagation axes;

a plurality of acoustic wave input transducers disposed on the substrate;

said coupled input transducers to be energized in parallel by input signals;

said input transducers each including a plurality of interdigitated fingers;

said fingers disposed along curves;

said curves defined relative to a selected propagation axis;

said individual transducers being spaced apart along said curves;

said transducers being successively advanced in phase by an integral number of acoustic wavelengths;

said wavelengths being measured at the center frequency of the input frequency band;

said transducers having widths and orientations relative to the selected propagation axis such that selected beam wavefronts are launched in converging directions toward a common focal region;

said focal region being located on a focal arc spaced along the axis at a predetermined distance;

said individual wavefronts forming a composite focused beam for each frequency component present within the band;

each of said beams deviating from the selected axis in accordance with the frequency; and a plurality of surface acoustic wave receivers disposed along the focal arc, each being tuned to a frequency corresponding to the composite beam focused at that respective position.

25. The invention as set forth in claim 24 above, wherein the input transducers include means to provide maximum acoustic fields at the center of the plurality of transducers, with monotonic reductions to the edges.

26. The invention as set forth in claim 25 above, wherein the input transducers include a plurality of geometrically varying interdigitated fingers configured to couple energy to the substrate across a range of frequencies broader than that which may be produced by a single geometry of such input transducers.

27. The invention as set forth in claim 24 above, wherein the substrate is an anisotropic medium with negative anisotropy and the input transducers are angled to compensate for beam steering effects.

28. The invention as set forth in claim 27 above, wherein the anisotropic medium is rotated Y, X-propagating $LiNbO_3$, with a rotated-Y cut in the range of 110° to 135°.

29. The invention as set forth in claim 28 above, wherein the rotated Y cut in said anisotropic medium is a 128° angle.

30. The invention as set forth in claim 24 above, wherein the input transducers are relatively advanced in phase by one acoustic wavelength at the center frequency to propagate the first order composite beam to the output.

31. The invention as set forth in claim 27 above, wherein the output transducers are proportioned in size to the wavelengths of the beam wavefronts impinging thereat, and angled to compensate for beam steering effects.

32. The invention as set forth in claim 24 above, wherein the output transducers include means for varying the relative contributions thereof to the composite focused beams.

33. A system for interchanging energy between input and output in a multi-frequency wave transformation system comprising:

a wave propagating substrate;

a plurality of input transducers coupled in operative relation to one region of the substrate;

said input transducers spatially disposed to couple multi-frequency input energy to the substrate such as to form at least one main composite lobe at a frequency depednent angle;

said main lobe being accompanied by sidelobes;

said input transducers including means for varying the individual power contributions therefrom in accordance with a predetermined weighting function to diminish sidelobe propagation relative to the main lobe;

a plurality of output transducers coupled in operative relation to a second region of the substrate;

said output transducers spatially disposed to convert wave energy propagating in the substrate into limited frequency band electrical signals;

said output transducers comprising interdigitated finger devices tuned to different limited signal frequency bands;

said finger shapes matching the phase fronts of the propagated waves.

34. The invention as set forth in claim 33 above, wherein the input transducers form a main composite lobe focused within a focal region of predetermined depth and wherein the output transducers are disposed within the focal region.

35. The invention as set forth in claim 33 above, wherein the input transducers and output transducers are individually angled to compensate for beam steering effects in the substrate.

36. The invention as set forth in claim 33 above, wherein power contributions from the input transducers are varied such that peak contributions are from the transducers in the center of the plurality, with contributions diminishing monotonically to the transducers at the edge of the plurality, the ratio of the power contributions between maximum and minimum being no greater than approximatey 12:1.

* * * * *